US011773935B2

(12) United States Patent
Ravindranath

(10) Patent No.: US 11,773,935 B2
(45) Date of Patent: Oct. 3, 2023

(54) THERMAL MANAGEMENT SYSTEM

(71) Applicant: Transportation IP Holdings, LLC, Norwalk, CT (US)

(72) Inventor: Balaji Hosadurgam Ravindranath, Mysore (IN)

(73) Assignee: Transportation IP Holdings, LLC, Norwalk, CT (US)

( * ) Notice: Subject to any disclaimer, the term of this patent is extended or adjusted under 35 U.S.C. 154(b) by 130 days.

(21) Appl. No.: 17/167,975

(22) Filed: Feb. 4, 2021

(65) Prior Publication Data

US 2022/0243776 A1 Aug. 4, 2022

(51) Int. Cl.
*F16D 65/78* (2006.01)
*F16D 65/12* (2006.01)
*F16D 65/02* (2006.01)

(52) U.S. Cl.
CPC .......... *F16D 65/128* (2013.01); *F16D 65/78* (2013.01); *F16D 2065/1388* (2013.01)

(58) Field of Classification Search
CPC ...... F04D 17/16; F04D 29/441; F04D 29/582; F04D 29/601; F16D 65/78; F16D 65/123–128; F16D 65/847; F16D 65/84; F16D 2065/1388
USPC .............. 188/18 A, 218 XL, 264 A, 264 AA
See application file for complete search history.

(56) References Cited

U.S. PATENT DOCUMENTS

| 2,053,735 | A | 9/1936 | Claude |
| 5,544,726 | A | 8/1996 | Topoizian et al. |
| 9,793,779 | B2* | 10/2017 | Heidebrink .......... H02K 11/046 |
| 2007/0181389 | A1 | 8/2007 | Moore et al. |
| 2010/0096226 | A1 | 4/2010 | Gelb |
| 2012/0175203 | A1* | 7/2012 | Robertson ............. F16D 65/847 |
|  |  |  | 188/264 A |
| 2012/0175230 | A1 | 7/2012 | Hammond |

FOREIGN PATENT DOCUMENTS

| DE | 102013106581 A1 | 12/2014 |
| EP | 1747910 A2 | 1/2007 |
| EP | 2265839 B1 | 9/2011 |

(Continued)

OTHER PUBLICATIONS

Search Report for corresponding EU Application No. 202290199 (6 pages). English translation included.

(Continued)

*Primary Examiner* — Christopher P Schwartz
(74) *Attorney, Agent, or Firm* — THE SMALL PATENT LAW GROUP LLC; Mary D. Lawlor

(57) ABSTRACT

A thermal management system includes a shaft extending along an axis and configured to rotate in at least one of two different directions about the axis, and a brake system operably coupled with the shaft. The brake system controls a speed of rotation of the shaft in the at least one of the different directions. A first fan structure is operably coupled with the shaft and disposed on a first side of the brake system, and a second fan structure is operably coupled with the shaft and disposed on a second side of the brake structure. One of the first or second fan structures is configured to direct fluid toward the brake system and the other of the first or second fan structures is configured to direct at least some of the fluid away from the brake system to control a temperature of the brake system.

20 Claims, 5 Drawing Sheets

(56) References Cited

FOREIGN PATENT DOCUMENTS

KR  20110080220 A  7/2011
SU      712565 A1  1/1980

OTHER PUBLICATIONS

Extended European Search Report for corresponding EP Application No. 22154239.2-1012 dated Jun. 23, 2022.
Search Report for corresponding Eurasian Application No. 202290199 dated Nov. 8, 2022 (4 pages). English translation included.
Search Report for corresponding Eurasian Application No. 202290199 (6 pages). English translation included.
Conculsion on Patentability of the invention for corresponding Eurasian Application No. 202290199 dated Apr. 28, 2023 (4 pages). English translation included.

* cited by examiner

THERMAL MANAGEMENT SYSTEM

BACKGROUND

Technical Field

The subject matter described herein relates to thermal management systems for brake systems.

Discussion of Art

Brake systems used to control a speed of rotation of shafts or axles are subject to increased temperatures during operation. The temperature of a brake disc, for example, may be controlled to improve the life and safety of use of the brake disc and brake system. As one solution, brake discs may include cooling passages that control an amount of cooling fluid directed around the brake disc to control the temperature of the brake system. The amount of cooling fluid may be based on the speed of rotation of the axle. For example, the amount of cooling fluid directed toward the brake system may increase at increasing speeds of rotation of the axle, and may decrease at decreasing speeds of rotation of the axle.

However, automobiles and other vehicles typically move in one direction only (e.g., forward), and may move in that one direction at increased speeds relative to the movement in another direction. For example, an automobile axle rotates in a first direction to move the automobile in a forward direction at speeds that are greater than speeds of rotation to move the automobile in a rearward direction. Additional cooling methods may be needed in order to control the temperature of brake systems that may be used to control the speed of rotation of axles that rotate in multiple directions at substantially equal speeds.

BRIEF DESCRIPTION

In one or more embodiments, a thermal management system includes a shaft extending along an axis and configured to rotate in at least one of two different directions about the axis, and a brake system operably coupled with the shaft. The brake system controls a speed of rotation of the shaft in the at least one of the different directions. A first fan structure is operably coupled with the shaft and disposed on a first side of the brake system, and a second fan structure is operably coupled with the shaft and disposed on a second side of the brake structure. One of the first or second fan structures is configured to direct fluid toward the brake system and the other of the first or second fan structures is configured to direct at least some of the fluid away from the brake system to control a temperature of the brake system.

In one or more embodiments, a method includes directing fluid to move in a first direction toward a brake system by rotating a shaft in a first direction of rotation about an axis. The brake system is operably coupled with the shaft and controls a speed of rotation of the shaft. At least some of the fluid is directed in the same first direction away from the brake system by rotating the shaft in the first direction of rotation to control a temperature of the brake system.

In one or more embodiments, a thermal management system includes a shaft extending along an axis and configured to rotate in at least one of two different directions about the axis, and a brake system operably coupled with the shaft. The brake system controls a speed of rotation of the shaft in the at least one of the different directions. A first fan structure and a second fan structure are operably coupled with the shaft. The first and second fan structures rotate responsive to rotation of the shaft. The first fan structure is disposed on a first side of the brake system and the second fan structure is disposed on a second side of the brake system. One of the first or second fan structures is configured to direct fluid toward the brake system and the other of the first or second fan structures is configured to direct the fluid away from the brake system to control a temperature of the brake system. An amount of the fluid directed toward the brake system and an amount of the fluid directed away from the brake system is based on a speed of rotation of the shaft.

BRIEF DESCRIPTION OF THE DRAWINGS

The inventive subject matter may be understood from reading the following description of non-limiting embodiments, with reference to the attached drawings, wherein below.

DETAILED DESCRIPTION

Embodiments of the subject matter described herein relate to a thermal management system and method for controlling a temperature of a brake system. The brake system may be coupled with a shaft that extends along an axis that rotates in at least one of two different directions about the axis. The brake system controls the speed of rotation of the shaft. In one or more embodiments, the brake system may include one or more fan structures operably coupled with the shaft. For example, a first fan structure may be disposed on a first side of the brake system, and a second fan structure may be disposed on a second side of the brake system. The first and second fan structures rotate with the rotation of the shaft. For example, the first and second fan structures receive rotational power from the rotation of the shaft. Based on the direction of rotation of the shaft, one of the first or second fan structures directs fluid toward the brake system and the other directions at least some fluid away from the brake system to control a temperature of the brake system.

The first and second fan structures switch which of the first or second fan structures directs fluid toward the brake system based on the direction of rotation of the shaft. For example, the first fan structure may direct fluid toward the brake system and the second fan structure may direct fluid away from the brake system responsive to the shaft rotating in a first direction of rotation. Alternatively, the second fan structure may direct fluid toward the brake system and the first fan structure may direct fluid away from the brake system responsive to the shaft rotating in a second direction of rotation.

Figure 1:
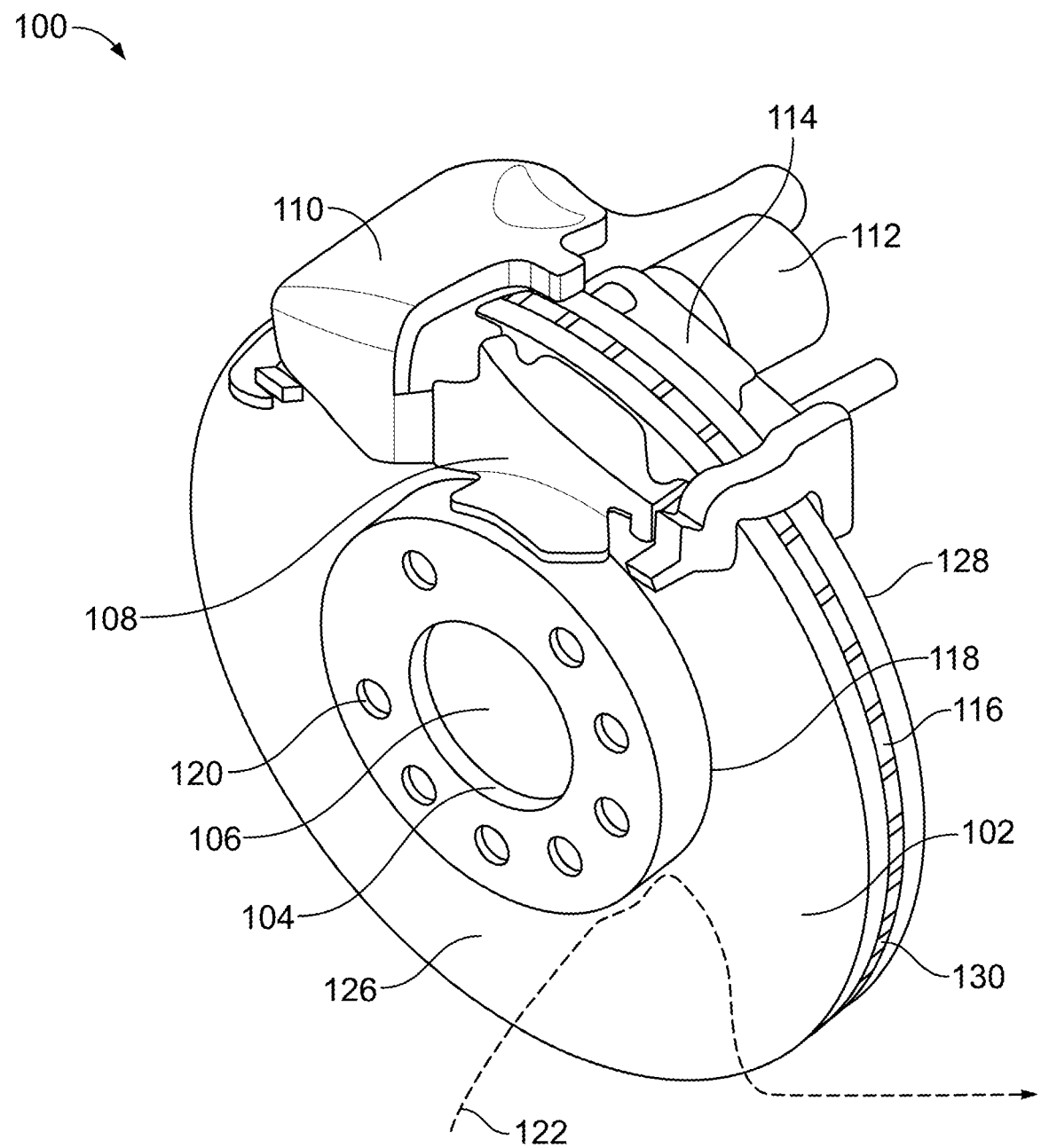
FIG. 1 illustrates a partial cross-sectional perspective view of one example of a brake system in accordance with one embodiment.

FIG. 1 illustrates a partial cross-sectional perspective view of one example of a brake system 100 in accordance with one embodiment. The brake system includes a disc rotor or disc 102 operably coupled with a hub 104. The disc and the hub include a passage 106 through which a shaft or axle may extend (not shown). In the illustrated embodiment, the brake system includes an axle-mounted disc such that the disc is mounted or operably coupled with an axle or shaft. For example, the disc may be disposed a distance away from a wheel or other rotating component operably coupled with the shaft. Optionally, the brake system may include a wheel-mounted disc such that the disc may be disposed proximate to, operably coupled with, or the like a wheel or other rotating component of a system.

The hub includes plural fasteners 120, such as bolts, screws, rivets, or any alternative fastening components, that couple the hub to the disc. The brake system includes a first pad 108 is disposed on a first side 126 of the disc and a second pad 114 is disposed on a second side 128 of the disc. A piston 112 controls a caliper assembly 110 to control an amount of pressure the pads exert onto the disc to control a speed of rotation of the disc.

In one or more embodiments, the disc may include disc passages 116 that are fluidly coupled with a hub passage 118 disposed between the hub and the disc. For example, fluid may be directed into the hub passage, through an interior portion of the disc (not shown), and out of the disc via the disc passages. In the illustrated embodiment, the disc includes plural disc passages that are disposed on an exterior surface 130 of the disc and extend about a center axis of the passage 106. Optionally, the disc may include any number of disc passages that may be fluidly coupled with each other and/or with the hub passage in any alternative configuration. In one or more embodiments, the disc may include one or more passages disposed on the first side of the disc, one or more passages disposed on the second side of the disc, and/or one or more passages disposed on the exterior surface of the disc, in any configuration.

The passages control flow characteristics of a fluid to move in a direction 122 through the hub and disc to manage a temperature of the disc, the hub, and the brake system. For example, the shape, size, placement, and fluid coupling of the passages may control the energy of the fluid to move in one or more directions through the hub, to control an amount of the fluid that moves through the hub, to control a direction of movement of the fluid, to control an amount and/or placement of turbulence of the fluid, or the like. In one or more embodiments, the disc may include passages on the first side that are shaped and/or sized differently than passages on the second side to control an amount of the fluid directed out of the first side that may be different then an amount of the fluid directed out of the second side. Optionally, the hub, the disc, and the passages of the hub and/or the disc may have any alternative configuration to control one or more characteristics of the fluid that moves about the brake assembly.

In one or more embodiments, the brake system may be disposed onboard a vehicle (not shown) such as a rail vehicle, an automobile, a truck, a bus, a mining vehicle, a marine vessel, an aircraft (manned or unmanned, such as drones), an agricultural vehicle, or another off-highway vehicle wherein, the rotational speed of an object required to be controlled, limited, or in situations where a rotating object has to be brought to a halt. While vehicles are one example, not all embodiments are limited to vehicles or vehicle systems. Optionally, the brake system may be disposed on or operably coupled with a non-vehicle alternative system, such as a wind-powered turbine, manufacturing machinery, power generating systems, domestic appliances, or any other system that includes a multi-direction rotating shaft.

In one or more embodiments, the brake system shown in FIG. 1 may be a part of a brake system of a vehicle system, such as a rail vehicle system, that includes two or more vehicles that may travel together (by being mechanically coupled or by being mechanically separate but logically coupled and communicating with each other to travel together, such as in a convoy or a locomotive consist where multiple locomotives communicate and operate together as a train). At least one vehicle of a vehicle system may be a propulsion-generating vehicle, and optionally the vehicle system may include one or more non-propulsion-generating vehicles.

Figure 2:
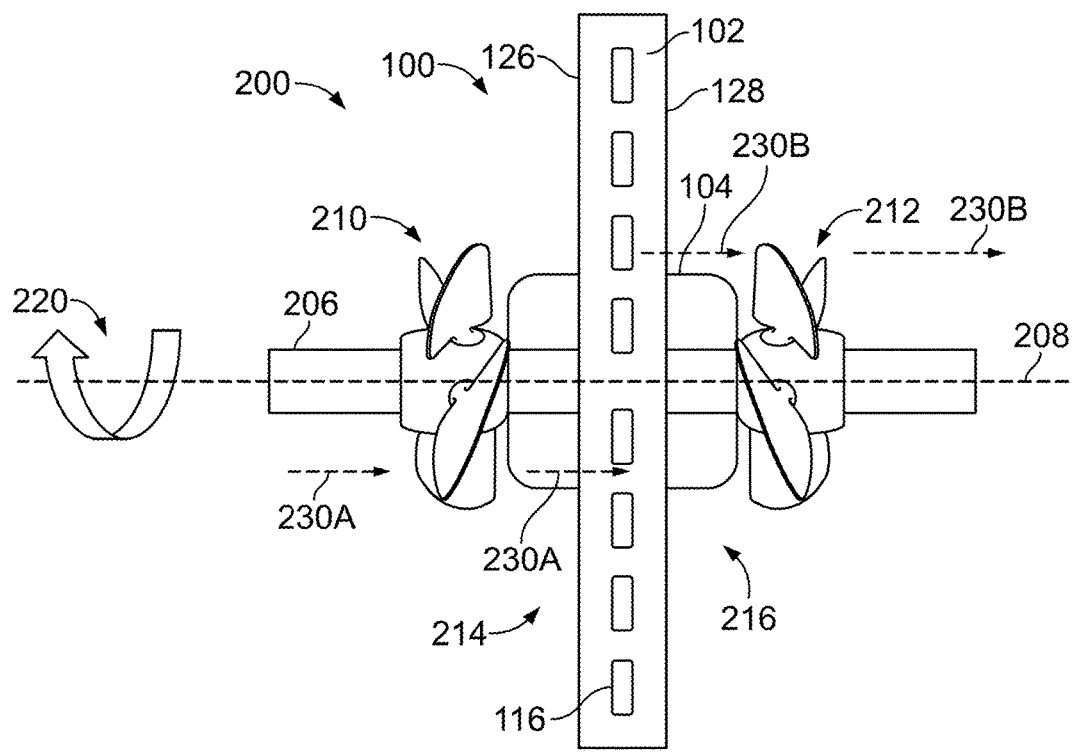
FIG. 2 illustrates a top view of one example of a thermal management system in accordance with one embodiment operating in a first mode of operation.

FIG. 2 illustrates a top view of one example of a thermal management system 200 in accordance with one embodiment. The thermal management system includes the brake system 100 shown in FIG. 1 and a shaft 206 that extends along an axis 208 that is disposed within the passage 106 (shown in FIG. 1). The shaft rotates in at least one of two different directions. In the illustrated embodiment of FIG. 2, the thermal management system may operate in a first mode of operation such that the shaft rotates in a first direction 220 about the axis.

The shaft is operably coupled with the disc 102 and the hub 104 of the brake system. The thermal management system also includes a first fan structure 210 operably coupled with the shaft and disposed on a first side 214 of the brake system, and a second fan structure 212 operably coupled with the shaft and disposed on a second side 216 of the brake system in a direction along the axis. The first and second fan structures may be operably coupled with the shaft such that the first and second fan structures rotate with rotation of the shaft. The fan structures receive rotational power from the rotation of the shaft. For example, the first and second fan structures rotate in a same direction of rotation of the shaft, and the first and second fan structures rotate at a same velocity as a velocity of rotation of the shaft.

In one embodiment, the first and/or second fan structures may include a center passage (not shown) that may receive the shaft. In another embodiment, the first and second fan structures may be operably coupled with the shaft via alternative coupling methods. For example, the first and second fan structures may include fasteners and/or coupling systems that couple the fan structures to the hub of the brake system. Optionally, the first and/or second fan structures may be operably coupled with the disc of the brake system. Optionally, the first and second fan structures may be coupled via alternative methods such that rotational movement of the shaft controls the rotational movement of the fan structures. Optionally, a gearing arrangement or a gearbox may be included and/or operably coupled with one or both of the fan structures to convert the shaft rotation into the fan rotation at different speeds and/or changing the direction of rotation.

Figure 4:
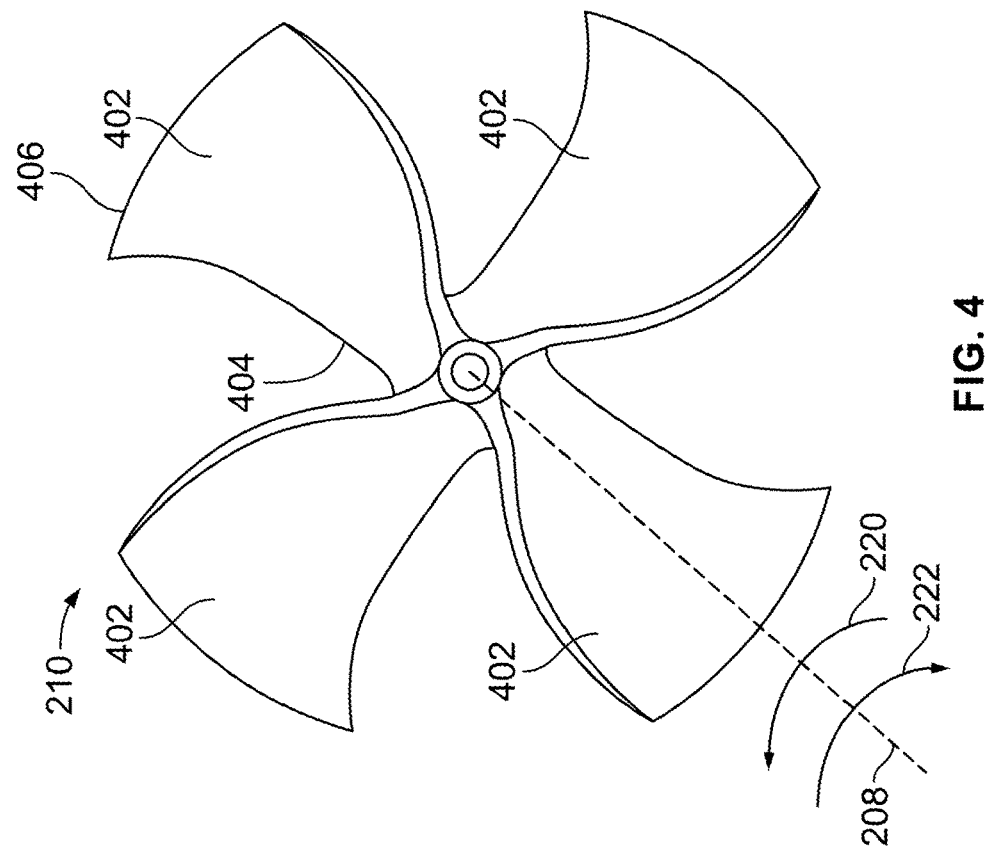
FIG. 4 illustrates a side view of a first fan structure in accordance with one embodiment.

In one or embodiments, the first and second fan structures may include blades or the like that direct fluid in one or more different directions. FIG. 4 illustrates a side view of the first fan structure in accordance with one embodiment, and 5 illustrates a side view of the second fan structure in accordance with one embodiment. The first fan structure includes plural first blades 402, with each of the plural first blades extending between interior ends 404 disposed proximate the axis 208, and exterior ends 406 disposed a distance away from the axis. Similarly, the second fan structure includes plural second blades 502, each extending between interior ends 504 disposed proximate the axis and exterior ends 506 disposed a distance away from the axis. The first blades are disposed at first angular positions between the interior ends and the exterior ends, and the second blades are disposed at different, second angular positions between the interior ends and the exterior ends of the second blades. For example, the second fan structure is mirrored with the first fan structure about the disc (shown in FIG. 2).

Figure 5:
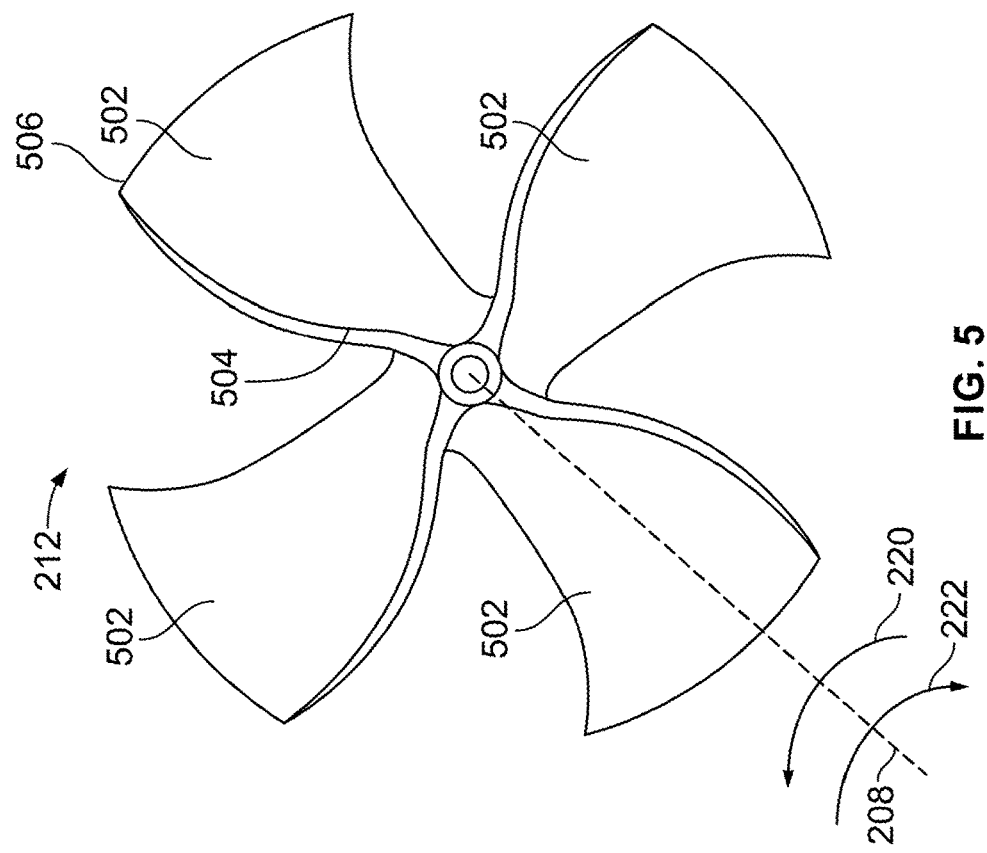
FIG. 5 illustrates a side view of a second fan structure in accordance with one embodiment.

In the illustrated embodiments of FIGS. 4 and 5, the first and second fan structures each include four blades, but alternatively may include any number of blades, may include the same or different number of blades relative to the other fan structure, or the like. Each of the first blades have a substantially uniform shape and size relative to each other first blade and the plural second blades. Optionally, one or more of the first blades and/or second blades may have a unique shape and/or size. In one or more embodiments, the first fan structure may be symmetrically mirrored with the second fan structure, or alternatively may not be symmetrically mirrored with the second fan structure. For example, the first blades of the first fan structure may be disposed at first angular positions and the second blades of the second fan structure may be disposed at second angular positions, but the second angular positions may not be symmetrically mirrored with the first angular positions of the first fan. Optionally, the first blades of the first fan structure may have a size between the interior and exterior ends that is different than a size of the second blades between the interior and exterior ends of the second blades. Optionally, the first fan structure may have a first number of first blades, and the second fan structure may have a number of second blades that is different than the number of first blades.

Returning to FIG. 2, the first and second fan structures rotate in the same direction and at the same velocity as the direction of rotation and the velocity of rotation as the shaft. As the shaft rotates, the fan structures rotate and direct fluid in different directions based on the direction of rotation of the shaft and same direction of rotation of the fan structures. In the illustrated embodiment of FIG. 2, the thermal management system operates in a first mode of operation such that the shaft rotates in the first direction of rotation 220 about the axis. As the shaft rotates in the first direction of rotation, the first and second fan structures also rotate in the first direction of rotation.

The configuration of the plural first blades of the first fan structure and the plural second fan blades of the second fan structure, directs fluid around the brake system in different directions. For example, one of the first or second fan structures may direct fluid toward the brake system and the other of the first or second fan structures may direct at least some of the fluid away from the brake system. Additionally, the shaft is configured to rotate in two different directions. Responsive to the shaft switching directions of rotations, the first and second fan structures are configured to switch which of the first or second fan structures directs fluid toward the brake system and which of the first or second fan structures directs fluid away from the brake system. The first and second fan structures direct the fluid in different directions towards and away from the brake system to control a temperature of the brake system. For example, at least one of the first or second fan structures directs fluid toward the brake system, and at least one of the fan structures directs fluid away from the brake system responsive to the shaft rotating in either direction of rotation.

In the illustrated embodiment of FIG. 2, responsive to the shaft rotating in the first direction of rotation 220, the first fan structure directs fluid toward the brake system in a direction 230A, and the second fan structure directs a portion of the fluid away from the brake structure in a direction 230B. The fluid may be directed from a location away from the brake system and toward the brake system via the first fan structure. In one or more embodiments, the first fan structure may direct at least some of the fluid into and through one or more disc passages of the brake system, and the second fan structure may direct at least some of the fluid out of the disc passages and away from the brake system.

Figure 3:
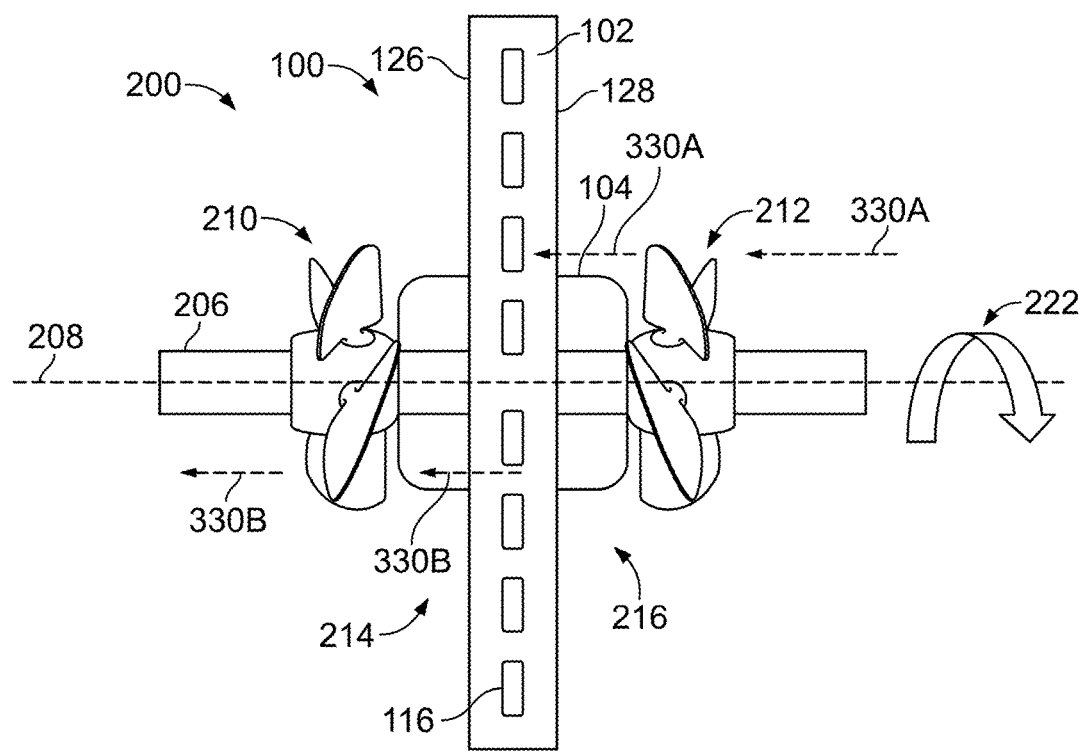
FIG. 3 illustrates the thermal management system shown in FIG. 2 operating in a second mode of operation.

FIG. 3 illustrates the thermal management system 200 operating in a second mode of operation. For example, the shaft rotates in a second direction of rotation 222 in the second mode of operation. Responsive to the shaft rotating in the second direction of rotation, the first and second fan structures switch which directs fluid toward the brake system, and which directs fluid away from the brake system based on the direction of rotation of the shaft. For example, as the shaft rotates in the second direction of rotation, the second fan structure directs fluid toward the brake system in a direction 330A, and the first fan structure directs at least a portion of the fluid away from the brake structure in a direction 330B.

In one or more embodiments, the first fan structure may have a size that is greater than a size of the second fan structure such that the first fan structure may direct an amount of fluid toward the brake system that is greater than an amount of fluid directed away from the brake system via the second fan structure. For example, a fan diameter of the first fan structure is greater than a fan diameter of the second fan structure. Optionally, the first fan structure may generate an amount of airflow at a speed of rotation that is greater than an amount of airflow generated by the second fan structure at the same speed of rotation. Optionally, the blades or airfoils of the first fan structure may be larger than the blades or airfoils of the second fan structure. Optionally, the brake system may reach a temperature responsive to the shaft rotating in one direction that is greater than a temperature of the brake system responsive to the shaft rotating in the other direction.

The first and second fan structures may be shaped and sized to control different amounts of fluid moving toward and away from the brake system to manage the different temperatures of the brake system. In one or more embodiments, the first and second fan structures may have different sizes, the first blades of the first fan structure may have sizes and/or be at angles that are the same and/or different than the sizes and/or angles of the second blades of the second fan structure. For example, flow of fluid may be more or less restricted on one side of the brake system than the other (e.g., by a spacer ring, or other component that may deprive or restrict the flow of fluid more than the other side of the brake system). The fan structures may be shaped and/or sized to direct an amount of air toward or away from the more restricted side of the brake system that is greater than an amount of air directed toward or away from the less restricted side of the brake system. For example, the first fan structure may not be symmetrically mirrored with the second fan structure.

The speed of rotation of the shaft and the direction of rotation of the shaft controls one or more flow characteristics of the fluid directed toward and away from the brake system via the first and second fan structures. For example, an increased speed of rotation increases an amount of volume of fluid that is directed toward and/or away from the brake system. Alternatively, a reduced speed of rotation reduces an amount of fluid that is directed toward and away from the brake system. For example, the first and second fan structures may control the temperature of the brake system based on an amount of the fluid directed toward the brake system and an amount of the fluid directed away from the brake system.

In one or more embodiments, control of the speed of rotation of the shaft may be controlled by an operator of the brake system. As one example, the brake system may be disposed onboard a vehicle system and the fluid may be air. The brake system and the first and second fan structures may be disposed onboard the vehicle system and operably coupled with a propulsion system (e.g., including a shaft) of the vehicle system. An operator onboard and/or off-board the vehicle system may control one or more settings of the brake system and/or one or more settings of a propulsion system including the shaft to control the speed and direction of rotation of the shaft, and as a result, an amount of the fluid and a direction of the fluid that is directed toward and away from the brake system.

In one or more embodiments, the vehicle system may be operably and/or communicatively coupled with a back-office server of a positive vehicle control (PVC) system or positive control system (PCS). The back-office server may be a vital or a non-vital system such that data stored, contained, maintained, communicated between, or the like, may be vital (e.g., protected) and/or non-vital (e.g., non-protected) data. The back-office server may remotely control brake settings of the brake system and propulsion settings of a propulsion system (e.g., including the shaft) of the vehicle system. The PCS system may control which vehicle of a vehicle system (not shown) is allowed to move and/or is allowed to move outside a designated restricted manner (such as above a designated penalty speed limit), only responsive to receipt or continued receipt of one or more signals (e.g., signals received from off-board the vehicle system) that meet designated criteria, e.g., the signals have designated characteristics (e.g., a designated waveform and/or content) and/or are received at designated times (or according to other designated time criteria) and/or under designated conditions. Alternatively, in a 'negative' control system (NCS), a vehicle may be allowed to move unless a signal (restricting movement) is received. For example, in a PCS, vehicles have onboard systems that prevent the vehicles from performing one or more operations unless a signal is received from an off-board source granting permission to perform the operation, and in a NCS, vehicles may include onboard systems that allow the vehicle to perform the one or more operations unless a signal is received from an off-board source prohibiting the performance of the one or more operations.

In one or more embodiments, the thermal management system may include one or more sensors (not shown) operably coupled with one or more components of the brake system, operably coupled with the shaft, or the like, that may detect thermal characteristics of the brake system, the first fan structure, and/or the second fan structure. Optionally, one or more sensors may be operably coupled with the brake system and may detect flow characteristics of the fluid that is directed around the brake system. An operator may manually control operation of the brake system and/or the rotation of the shaft, or a control system may automatically control operation of the brake system and/or the speed of rotation of the shaft based on the detected thermal and/or flow characteristics exceeding one or more predetermined thresholds.

Figure 6:
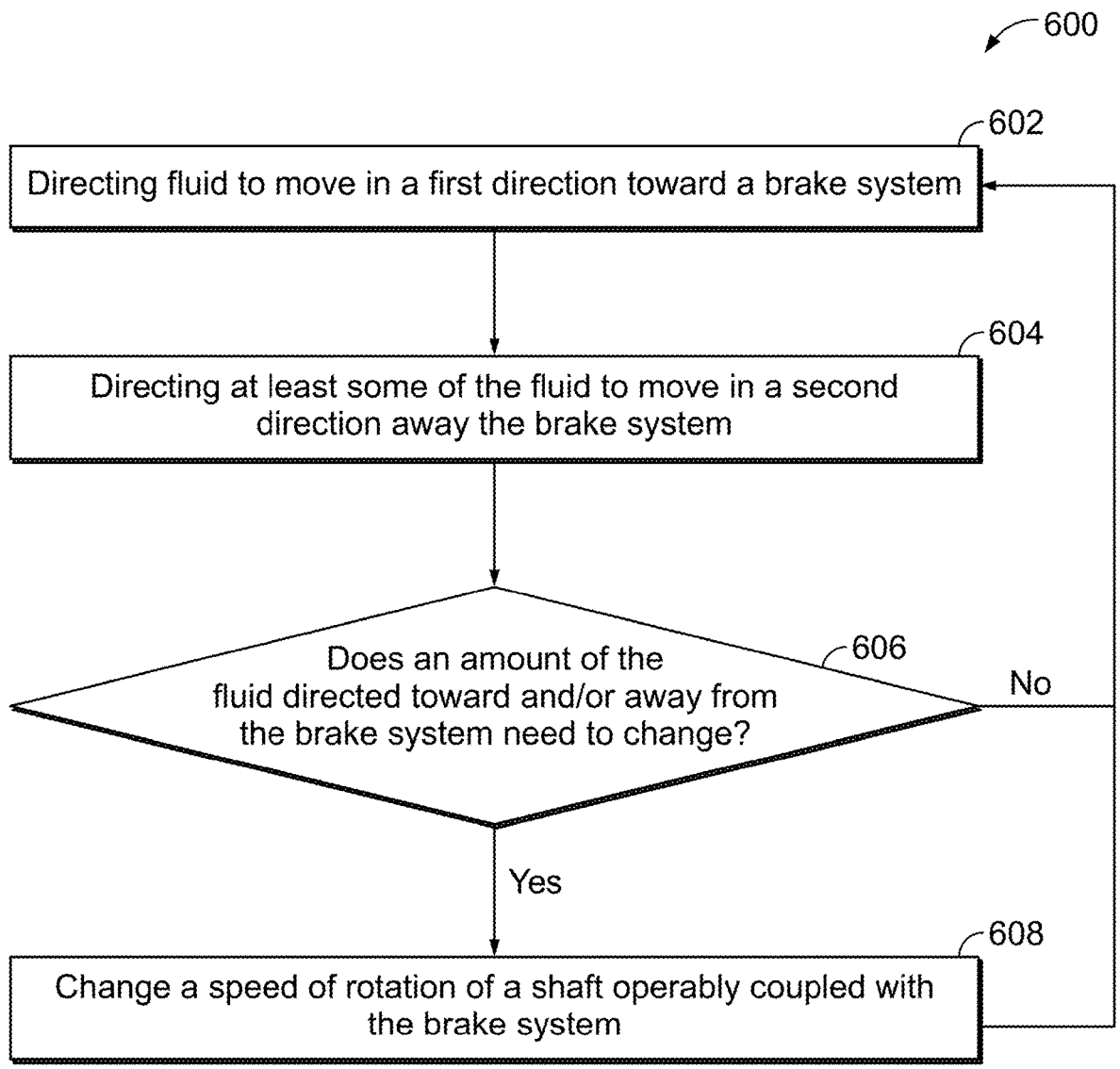
FIG. 6 illustrates a flowchart of one example of a method for controlling a thermal management system in accordance with one embodiment.

FIG. 6 illustrates a flowchart 600 of one example of a method for controlling a thermal management system in accordance with one embodiment. The operations described in connection with the method can be performed by a controller of the thermal management system, an operator of the thermal management system, or the like.

At 602, fluid is directed to move in a first direction toward a brake system. The fluid may be directed toward the brake system by rotating a shaft in a first direction of rotation about an axis. The brake system may control a speed of rotation of the shaft. A first fan structure operably coupled with the shaft may rotate in the first direction of rotation with the rotation of the shaft and may be shaped to direct the fluid toward the brake system. For example, the first fan structure may rotate at a velocity that is the same as a velocity of rotation of the shaft.

At 604, at least some of the fluid is directed to move in a second direction away from the brake system. A second fan structure operably coupled with the shaft may rotate in the same first direction of rotation with the rotation of the shaft and the first fan structure, and may be shaped to direct the fluid away from the brake system.

In one or more embodiments, the fluid may be directed to move in the first direction toward the brake system from a position on one side of the brake system, and at least some of the fluid may be directed to move in the same first direction away from the brake system toward a position on another side of the brake system. For example, FIG. 2 illustrates the first fan structure directing the fluid to move in the first direction 230A toward the brake system from a position on the first side 214 of the brake system, and the second fan structure directing at least some of the fluid to move in the same first direction 230B but in a direction away from the brake system toward a position on the second side 216 of the brake system by rotating the shaft in the first direction of rotation. Alternatively, FIG. 3 illustrates the second fan structure directing the fluid to move in a second direction 330A toward the brake system from a position on the second side of the brake system, and the first fan structure directs at least some of the fluid to move in the same second direction 330B but in a direction away from the brake system toward a position on the second side of the brake system by rotating the shaft in the second direction of rotation.

At 606, a decision is made whether an amount of the fluid directed toward and/or away from the brake system needs to change. The fluid is directed toward and away from the brake system to control a temperature of the brake system. For example, the brake system may have a temperature that is outside of a predetermined temperature threshold (e.g., the temperature may exceed the predetermined threshold, or alternatively may be within a predetermined threshold range and may be able to withstand a greater temperature and remain within the predetermined threshold range). If the amount of fluid directed toward and/or away from the brake system does not need to change, flow of the method returns to 602. The method may continue while a system including the brake system is operating, for a predetermined amount of time, or the like.

Alternatively, if the amount of fluid directed toward and/or away from the brake system needs to change, flow of the method proceeds toward 608. At 608, a speed of rotation of a shaft is changed. In one or more embodiments, a controller of the brake system and/or a propulsion system that includes the shaft may automatically change the speed of rotation of the shaft. Optionally, an operator of the brake system may manually change the speed of rotation of the shaft to change an amount of the fluid that is directed toward and/or away from the brake system via the first and second fan structures. The temperature of the brake system is controlled based on the speed of rotation of the shaft.

Figure 7:
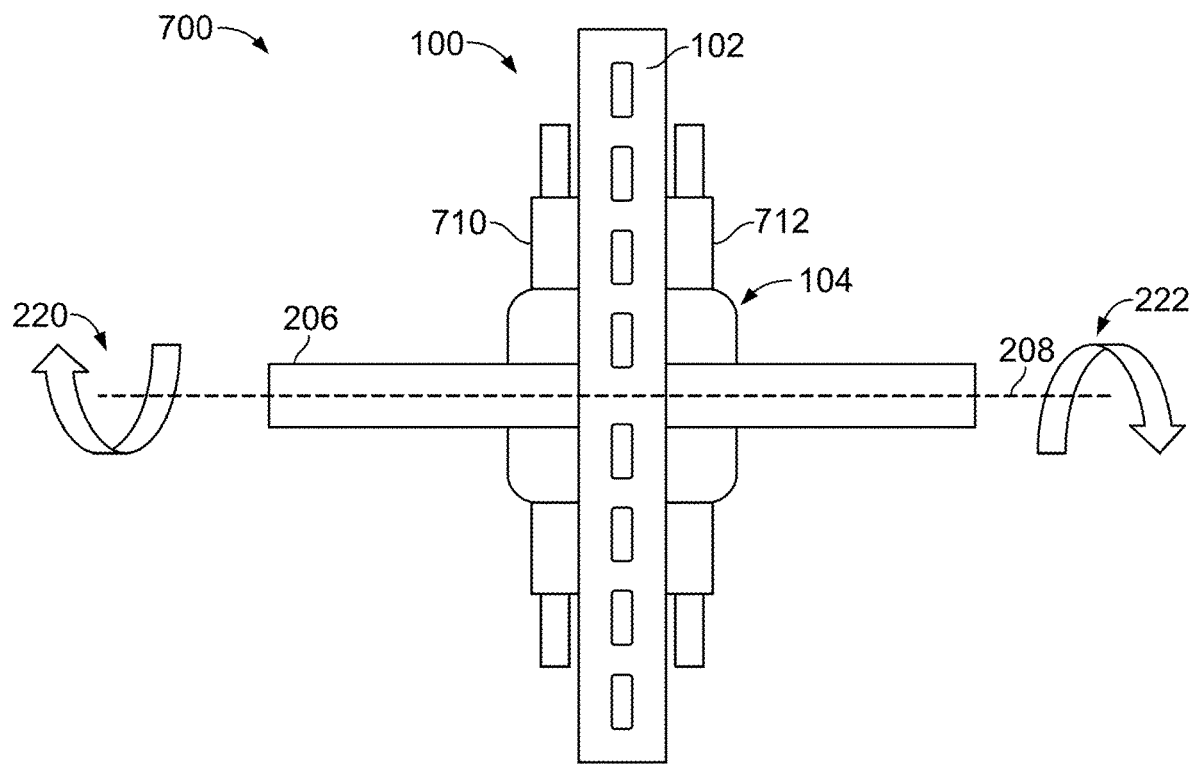
FIG. 7 illustrates a top view of one example of a thermal management system in accordance with one embodiment.

In one or more embodiments, one or both of the first or second fan structures may be disposed at other locations along the shaft relative to the hub and/or the disc of the brake system. For example, the first fan structure may be disposed a distance away from the hub such that a gap is disposed between the first fan structure and the hub on the first side of the brake system along the shaft. Optionally, the second fan structure may be disposed a distance away from the hub such that a gap is disposed between the second fan structure and the hub on the second side of the brake system along the shaft. Alternatively, FIG. 7 illustrates a top view of one example of a thermal management system 700 in accordance with one embodiment. The thermal management system includes the brake system 100 shown in FIG. 1, a first fan structure 710 disposed on a first side of the brake system, and a second fan structure 712 disposed on a second side of the brake system. In the illustrated embodiment of FIG. 7, the first and second fan structures are operably coupled with the brake system. For example, a center passage of each of the first and second fan structures may receive the hub on the first and second sides of the brake system, respectively. The first fan structure is operably coupled with the hub of the brake system, and indirectly coupled with the shaft 206, and the second fan structure is operably coupled with the hub of the brake system, and is indirectly coupled with the shaft.

Figure 8:
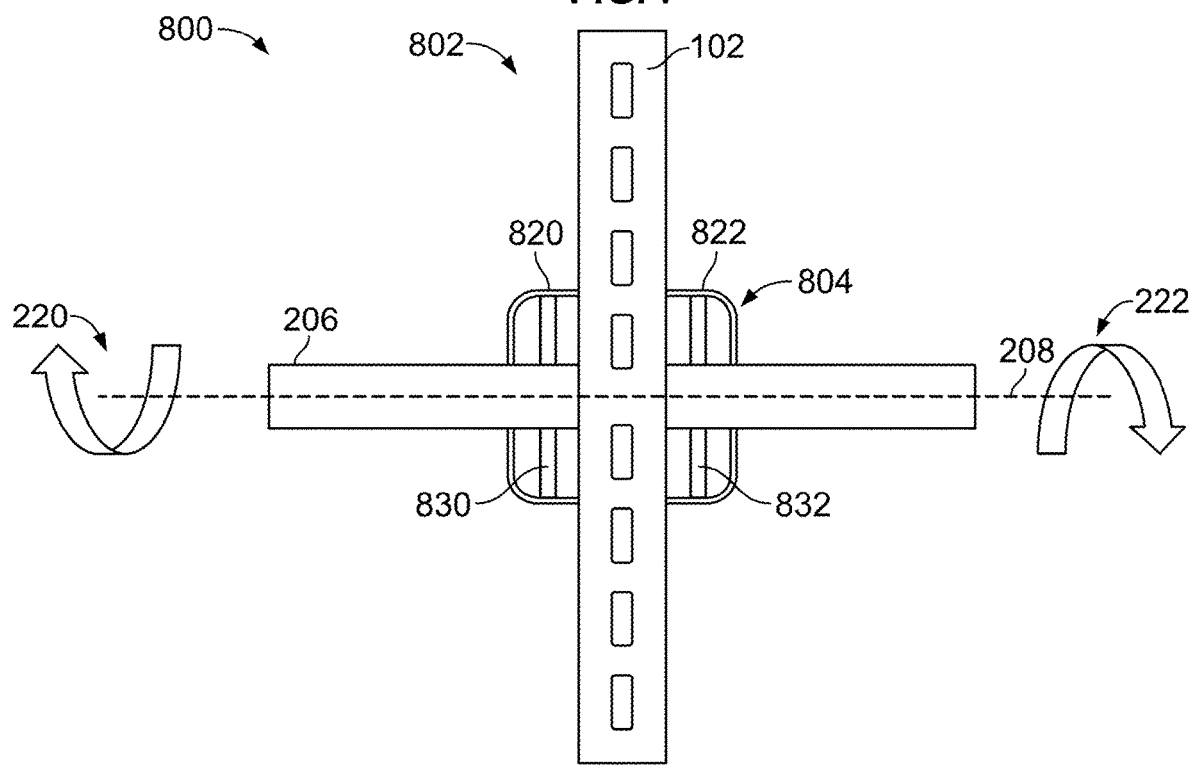
FIG. 8 illustrates a top view of one example of a thermal management system in accordance with one embodiment.

FIG. 8 illustrates a top view of one example of a thermal management system 800 in accordance with one embodiment. The thermal management system includes a brake system 802, the shaft 206, and fan structures. The brake system is operably coupled with the disc to control a speed of rotation of the shaft. The disc is operably coupled with the shaft via a hub 804. The hub 804 includes a first structure 820 of the hub that is disposed on a first side of the disc and a second structure 822 that is disposed on a second side of the disc along the shaft. The first and second structures include fan structures 830, 832, such as blades, airfoils, or the like, that direct fluid toward and/or away from the brake system. Different than the thermal management system shown in FIGS. 2 and 3, the hub structures of the thermal management system 800 include blades that are shaped and/or sized to control an amount of fluid directed toward and away from the brake system. For example, the hub and first and second fan structures are formed as a unitary structure or embodiment.

In one or more embodiments of the subject matter described herein, a thermal management system includes a shaft extending along an axis and configured to rotate in at least one of two different directions about the axis, and a brake system operably coupled with the shaft. The brake system controls a speed of rotation of the shaft in the at least one of the different directions. A first fan structure is operably coupled with the shaft and disposed on a first side of the brake system, and a second fan structure is operably coupled with the shaft and disposed on a second side of the brake structure. One of the first or second fan structures is configured to direct fluid toward the brake system and the other of the first or second fan structures is configured to direct at least some of the fluid away from the brake system to control a temperature of the brake system.

Optionally, the first and second fan structures may rotate in a same direction of rotation of the shaft.

Optionally, the first and second fan structures may switch between which of the first or second fan structures directs the fluid toward the brake system based on the direction of rotation of the shaft.

Optionally, the first fan structure may include plural first blades and the second fan structure may include plural second blades. The plural first blades may be disposed at first angular positions between interior ends and exterior ends of the plural first blades, and the plural second blades may be disposed at second angular positions between interior ends and exterior ends of the plural second blades.

Optionally, the first fan structure may direct the fluid toward the brake system and the second fan structure may direct the at least some of the fluid away from the brake structure responsive to the shaft rotating in a first direction of the different direction.

Optionally, the first fan structure may direct the at least some of the fluid away the brake system and the second fan structure may direct the fluid toward from the brake structure responsive to the shaft rotating in a second direction of the different direction.

Optionally, an amount of the fluid directed toward the brake system and an amount of the fluid directed away from the brake system is based on a speed of rotation of the shaft.

Optionally, the first and second fan structures may receive rotational power from the rotation of the shaft.

Optionally, the first fan structure may be operably coupled with the brake system on the first side of the brake system and the second fan structure may be operably coupled with the brake system on the second side of the brake system.

Optionally, the first and second fan structures may control the temperature of the brake system based on an amount of the fluid directed toward the brake system and an amount of the fluid directed away from the brake system.

Optionally, the fluid is air and the brake system and the first and second fan structures are disposed onboard a vehicle system.

Optionally, the first fan structure may generate an amount of airflow at a speed of rotation that is greater than an amount of airflow generated by the second fan structure at the same speed of rotation.

In one or more embodiments of the subject matter described herein, a method includes directing fluid to move in a first direction toward a brake system by rotating a shaft in a first direction of rotation about an axis. The brake system is operably coupled with the shaft and controls a speed of rotation of the shaft. At least some of the fluid is directed in the same first direction away from the brake system by rotating the shaft in the first direction of rotation to control a temperature of the brake system.

Optionally, a first fan structure operably coupled with the shaft directs the fluid to move in the first direction toward the brake system, and a second fan structure operably coupled to the shaft directs the at least some of the fluid to move in the same first direction away from the brake system Optionally, the method may include directing the fluid to move in the first direction toward the brake system from a position on one side of the brake system, and directing the at least some of the fluid to move in the same first direction away from the brake system toward a position on another side of the brake system.

Optionally, the method may include directing the fluid to move in a second direction toward the brake system and directing the at least some of the fluid to move in the same second direction away from the brake system by rotating the shaft in a second direction of rotation about the axis.

Optionally, the fluid may be directed to move in the second direction toward the brake system from a position on one side of the brake system, and the at least some of the fluid may be directed to move in the same second direction away from the brake system toward a position on another side of the brake system.

Optionally, an amount of the fluid that moves in the first direction toward the brake system and an amount of the at least some of the fluid that moves in the same first direction away from the brake system may be controlled based on the speed of rotation of the shaft.

Optionally, the temperature of the brake system may be controlled based on the speed of rotation of the shaft.

In one or more embodiments of the subject matter described herein, a thermal management system includes a shaft extending along an axis and configured to rotate in at least one of two different directions about the axis, and a brake system operably coupled with the shaft. The brake system controls a speed of rotation of the shaft in the at least one of the different directions. A first fan structure and a second fan structure are operably coupled with the shaft. The first and second fan structures rotate responsive to rotation of the shaft. The first fan structure is disposed on a first side of the brake system and the second fan structure is disposed on a second side of the brake system. One of the first or second fan structures is configured to direct fluid toward the brake system and the other of the first or second fan structures is configured to direct the fluid away from the brake system to control a temperature of the brake system. An amount of the fluid directed toward the brake system and an amount of the fluid directed away from the brake system is based on a speed of rotation of the shaft.

Optionally, the first and second fan structures may switch which of the first or second fan structures directs the fluid toward the brake system based on the direction of rotation of the shaft.

As used herein, the terms "processor" and "computer," and related terms, e.g., "processing device," "computing device," and "controller" may be not limited to just those integrated circuits referred to in the art as a computer, but refer to a microcontroller, a microcomputer, a programmable logic controller (PLC), field programmable gate array, and application specific integrated circuit, and other programmable circuits. Suitable memory may include, for example, a computer-readable medium. A computer-readable medium may be, for example, a random-access memory (RAM), a computer-readable non-volatile medium, such as a flash memory. The term "non-transitory computer-readable media" represents a tangible computer-based device implemented for short-term and long-term storage of information, such as, computer-readable instructions, data structures, program modules and sub-modules, or other data in any device. Therefore, the methods described herein may be encoded as executable instructions embodied in a tangible, non-transitory, computer-readable medium, including, without limitation, a storage device and/or a memory device. Such instructions, when executed by a processor, cause the processor to perform at least a portion of the methods described herein. As such, the term includes tangible, computer-readable media, including, without limitation, non-transitory computer storage devices, including without limitation, volatile and non-volatile media, and removable and non-removable media such as firmware, physical and virtual storage, CD-ROMS, DVDs, and other digital sources, such as a network or the Internet.

The singular forms "a", "an", and "the" include plural references unless the context clearly dictates otherwise. "Optional" or "optionally" means that the subsequently described event or circumstance may or may not occur, and that the description may include instances where the event occurs and instances where it does not. Approximating language, as used herein throughout the specification and clauses, may be applied to modify any quantitative representation that could permissibly vary without resulting in a change in the basic function to which it may be related. Accordingly, a value modified by a term or terms, such as "about," "substantially," and "approximately," may be not to be limited to the precise value specified. In at least some instances, the approximating language may correspond to the precision of an instrument for measuring the value. Here and throughout the specification and clauses, range limitations may be combined and/or interchanged, such ranges may be identified and include all the sub-ranges contained therein unless context or language indicates otherwise.

This written description uses examples to disclose the embodiments, including the best mode, and to enable a person of ordinary skill in the art to practice the embodiments, including making and using any devices or systems and performing any incorporated methods. The clauses define the patentable scope of the disclosure, and include other examples that occur to those of ordinary skill in the art. Such other examples are intended to be within the scope of the clauses if they have structural elements that do not differ from the literal language of the clauses, or if they include equivalent structural elements with insubstantial differences from the literal language of the clauses.

What is claimed is:

1. A thermal management system comprising:
a shaft extending along an axis and configured to rotate in at least one of two different directions about the axis;
a brake system operably coupled with the shaft, the brake system configured to control a speed of rotation of the shaft in the at least one of the different directions;
a first fan structure operably coupled with the shaft and disposed on a first side of the brake system, the first fan structure having plural first blades; and
a second fan structure operably coupled with the shaft and disposed on a second side of the brake system, the second fan structure having plural second blades,
wherein the plural first blades and the plural second blades are disposed at angular positions relative to the axis, and
wherein, responsive to the shaft rotating in a first direction of rotation, one of the first or second fan structures is configured to direct fluid in a first direction toward the brake system and across the brake system, and the other of the first or second fan structures is configured to direct at least some of the fluid in the same first direction away from the brake system to control a temperature of the brake system.

2. The thermal management system of claim 1, wherein the first and second fan structures are configured to rotate in a same direction of rotation of the shaft.

3. The thermal management system of claim 2, wherein the first and second fan structures are configured to switch which of the first or second fan structures directs the fluid in the first direction toward the brake system based on the direction of rotation of the shaft.

4. The thermal management system of claim 1, wherein the plural first blades are disposed at first angular positions between interior ends and exterior ends of the plural first blades, and the plural second blades are disposed at second angular positions between interior ends and exterior ends of the plural second blades.

5. The thermal management system of claim 1, wherein the brake system includes a disc having plural disc passages, wherein the first fan structure is configured to direct the fluid in the first direction into the plural disc passages of the disc of the brake system, and the second fan structure is configured to direct the at least some of the fluid in the first direction out of the plural disc passages of the disc responsive to the shaft rotating in a first direction of rotation.

6. The thermal management system of claim 5, wherein the first fan structure is configured to direct the at least some of the fluid in a second direction out of the plural disc passages and away from the brake system, and the second fan structure is configured to direct the fluid in the second direction toward the brake system and into the plural disc passages responsive to the shaft rotating in a second direction of rotation.

7. The thermal management system of claim 1, wherein an amount of the fluid directed in the first direction across the brake system and an amount of the fluid directed in the first direction away from the brake system is based on a speed of rotation of the shaft.

8. The thermal management system of claim 1, wherein the first and second fan structures are configured to receive rotational power from the rotation of the shaft.

9. The thermal management system of claim 1, wherein, responsive to the shaft rotating in the first direction of rotation, said one of the first or second fan structures is configured to direct fluid in the second direction toward the brake system and across the brake system, and the said other of the first or second fan structures is configured to direct at least some of the fluid in the same first direction away from the brake system, wherein the first and second fan structures are configured to direct the fluid only in the first direction while the shaft rotates in the first direction of rotation.

10. The thermal management system of claim 1, wherein the first and second fan structures are configured to control the temperature of the brake system based on an amount of the fluid directed in the first direction toward the brake system and across the brake system, and based on an amount of the fluid directed in the first direction away from the brake system.

11. The thermal management system of claim 1, wherein the fluid is air, and the brake system and the first and second fan structures are disposed onboard a vehicle system, wherein the speed of rotation of the shaft is based at least in part on a speed of movement of the vehicle system.

12. The thermal management system of claim 1, wherein the first fan structure is configured to generate an amount of airflow at a speed of rotation that is greater than an amount of airflow generated by the second fan structure at the same speed of rotation.

13. A method comprising:
directing fluid to move in a first direction toward a brake system and into plural disc passages of a disc of the brake system with one of a first fan structure or a second fan structure by rotating a shaft in a first direction of rotation about an axis, the brake system operably coupled with the shaft and configured to control a speed of rotation of the shaft, the first fan structure including plural first blades and the second fan structure including plural second blades, wherein the plural first blades are disposed at first angular positions relative to the axis and the plural second blades are disposed at second angular position relative to the axis; and
directing at least some of the fluid to move in the same first direction out of the plural disc passages and away from the brake system by the other of the first fan structure or the second fan structure by rotating the shaft in the first direction of rotation to control a temperature of the brake system.

14. The method of claim 13, wherein the first fan structure operably coupled with the shaft directs the fluid to move in the first direction toward the brake system and into the plural disc passages, and the second fan structure operably coupled with the shaft directs the at least some of the fluid to move in the same first direction out of the plural disc passages and away from the brake system.

15. The method of claim 13, further comprising directing the fluid to move in the first direction toward the brake system and into the plural disc passages from a position on one side of the brake system, and directing the at least some of the fluid to move in the same first direction out of the plural disc passages and away from the brake system toward a position on another side of the brake system responsive to rotating the shaft in the first direction of rotation.

16. The method of claim 13, further comprising directing the fluid to move in a second direction toward the brake system and into the plural disc passages, and directing the at least some of the fluid to move in the same second direction out of the plural disc passages and away from the brake system responsive to rotating the shaft in a second direction of rotation about the axis.

17. The method of claim 16, further comprising directing the fluid to move in the second direction toward the brake system from a position on one side of the brake system, and directing the at least some of the fluid to move in the same second direction away from the brake system toward a position on another side of the brake system responsive to rotating the shaft in the second direction of rotation.

18. The method of claim 13, further comprising controlling an amount of the fluid that moves in the first direction toward the brake system and an amount of the at least some of the fluid that moves in the same first direction away from the brake system based on the speed of rotation of the shaft.

19. The method of claim 13, further comprising controlling the temperature of the brake system based on the speed of rotation of the shaft.

20. A thermal management system comprising:
a shaft extending along an axis and configured to rotate in different directions about the axis;
a brake system operably coupled with the shaft, the brake system configured to control a speed of rotation of the shaft; and
a first fan structure and a second fan structure operably coupled with the shaft, wherein the first and second fan structures are configured to rotate responsive to rotation of the shaft, the first fan structure disposed on a first side of the brake system and the second fan structure disposed on a second side of the brake system, wherein the first fan structure includes plural first blades and the second fan structure includes plural second blades, wherein the plural first blades are disposed at first angular positions between interior ends and exterior ends of the plural first blades, and the plural second blades are disposed at second angular positions between interior ends and exterior ends of the plural second blades, wherein one of the first or second fan structures is configured to direct fluid toward the brake system and the other of the first or second fan structures is configured to direct the fluid away from the brake system based on the rotation of the shaft to control a temperature of the brake system, wherein an amount of the fluid directed toward the brake system and an amount of the fluid directed away from the brake system is based on a speed of rotation of the shaft.

* * * * *